(12) United States Patent
Sakamoto

(10) Patent No.: US 11,960,522 B2
(45) Date of Patent: Apr. 16, 2024

(54) INFORMATION MANAGEMENT SYSTEM FOR DATABASE CONSTRUCTION

(71) Applicant: Honda Motor Co., Ltd., Tokyo (JP)

(72) Inventor: Daisuke Sakamoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 123 days.

(21) Appl. No.: 17/680,332

(22) Filed: Feb. 25, 2022

(65) Prior Publication Data

US 2022/0292126 A1 Sep. 15, 2022

(30) Foreign Application Priority Data

Mar. 9, 2021 (JP) ................................. 2021-037109

(51) Int. Cl.
*G06F 16/00* (2019.01)
*G06F 16/35* (2019.01)

(52) U.S. Cl.
CPC .................. *G06F 16/353* (2019.01)

(58) Field of Classification Search
CPC ...... G06F 16/353; G06F 16/55; G06F 16/256; G06F 16/211; G06F 16/3338; G06F 40/40
See application file for complete search history.

(56) References Cited

U.S. PATENT DOCUMENTS

| | | | |
|---|---|---|---|
| 9,492,358 B2 * | 11/2016 | Lee | A61J 9/04 |
| 9,495,358 B2 * | 11/2016 | Zuev | G06F 40/55 |
| 2010/0312769 A1 | 12/2010 | Bailey et al. | |
| 2011/0238496 A1 | 9/2011 | Gurbuxani et al. | |
| 2011/0251977 A1 | 10/2011 | Cialowicz et al. | |
| 2013/0110928 A1 | 5/2013 | Ghosh et al. | |
| 2014/0128136 A1 | 5/2014 | Brown et al. | |
| 2014/0172751 A1 | 6/2014 | Greenwood | |
| 2014/0257795 A1 | 9/2014 | Birnbaum et al. | |
| 2015/0213109 A1 | 7/2015 | Kassko et al. | |
| 2017/0154107 A1 | 6/2017 | Awad et al. | |
| 2019/0385062 A1 | 12/2019 | Alcala et al. | |
| 2020/0042604 A1 * | 2/2020 | Ishikawa | G06F 40/58 |

(Continued)

FOREIGN PATENT DOCUMENTS

| | | |
|---|---|---|
| JP | H096802 | 1/1997 |
| JP | 2010009572 | 1/2010 |
| JP | 2010231826 | 10/2010 |

(Continued)

OTHER PUBLICATIONS

"Office Action of Related U.S. Appl. No. 17/680,329", dated Dec. 21, 2023, p. 1-p. 21.

(Continued)

*Primary Examiner* — Debbie M Le
(74) *Attorney, Agent, or Firm* — JCIPRNET

(57) ABSTRACT

An information management system is provided. An occurrence frequency of sensitivity information over a designated period that is associated with each of designated texts and stored in a database is evaluated over the designated period and a plurality of designated unit periods constituting the designated period for each sensitivity category. Then, a reference image showing the evaluation result is generated and transmitted to an information terminal device, and the reference image about each of a plurality of entities is simultaneously outputted on an output interface of the information terminal device.

20 Claims, 9 Drawing Sheets

(56) References Cited

U.S. PATENT DOCUMENTS

2021/0004432 A1* 1/2021 Li ..................... G06F 40/295
2022/0043987 A1* 2/2022 Wang .................. G06F 40/58

FOREIGN PATENT DOCUMENTS

| | | |
|---|---|---|
| JP | 2010272075 | 12/2010 |
| JP | 2011048527 | 3/2011 |
| JP | 2012079028 | 4/2012 |
| JP | 2013065272 | 4/2013 |
| JP | 2015085320 | 5/2015 |
| JP | 2017027359 | 2/2017 |
| JP | 2019175119 | 10/2019 |

OTHER PUBLICATIONS

"Office Action of Related U.S. Appl. No. 17/680,333", dated Oct. 3, 2023, p. 1-p. 38.

* cited by examiner

INFORMATION MANAGEMENT SYSTEM FOR DATABASE CONSTRUCTION

CROSS-REFERENCE TO RELATED APPLICATION

This application claims the priority benefit of Japan application serial no. 2021-037109, filed on Mar. 9, 2021. The entirety of the above-mentioned patent application is hereby incorporated by reference herein and made a part of this specification.

BACKGROUND

Technical Field

The disclosure relates to a system which searches information from a database.

Description of Related Art

To be able to estimate sensitivity characteristics of users at high accuracy, a technical method has been proposed to determine a user's sensitivity characteristics with respect to a keyword based on a search log about a specific keyword and the user's search history (see, for example, Patent Document 1: Japanese Patent Application Laid-Open No. 2017-027359).

With respect to a theme and/or a genre of particular interest to users on the Internet, a technical method capable of sharing and transmitting information that can be covered in a timely manner with good quality has been proposed (see, for example, Patent Document 2: Japanese Patent Application Laid-Open No. 2013-065272). Specifically, four axes of quality, time, space, and commonality and their coordinates, which represent a four-dimensional space of information as an information map, and a database and information space MAP linked to the four axes are constructed.

A technical method as described below has been proposed. It is possible to extract products with design attributes close to a design search request of a product, and by repeating reference, purchase, and evaluation from the results searched according to a design search condition, an evaluation value of a design attribute for each product is acquired, and a design attribute that reflects an objective evaluation is acquired (see, for example, Patent Document 3: Japanese Patent Application Laid-Open No. 2012-079028).

A technical method has been proposed to enable a sensitivity search for an aspect to which a sensitivity expression inputted as a search condition belongs and improve search accuracy by preventing images related to completely different aspects from becoming noise (see, for example, Patent Document 4: Japanese Patent Application Laid-Open No. 2011-048527). Specifically, when managing information using sensitivity expressions that represent an image of a search target, for a search that takes into account various aspects of the search target such as quality, appearance characteristics, and personality, a sensitivity expression is extracted from a text set and is linked to the search target. With these being taken as inputs, a sensitivity expression DB1 which stores sensitivity information for the sensitivity expression and side information to which the sensitivity expression belongs is used, and the sensitivity information is generated for each side information for the search target and then stored in a search target DB2.

A technical method has been proposed to enable a search from a sensitivity expression and/or a target word related to one target (see, for example, Patent Document 5: Japanese Patent Application Laid-Open No. 2010-272075). Specifically, by simply inputting a sensitivity expression or a search target word, a search result that is close to the input in terms of sensitivity can be obtained. In addition, to realize a sensitivity search that does not require addition of metadata related to the target, with text analysis and the target word list being taken as inputs, a sensitivity expression is extracted from the text according to a sensitivity expression dictionary and a sensitivity expression extraction rule. It is linked to the target word in the list, the sensitivity expressions are aggregated for each target word, and a sensitivity vector dictionary is used to generate sensitivity information for each target word.

A technical method has been proposed to enable a data search only by inputting subjective evaluation scores, even for a target for which it is difficult to extract objective numerical values associated with subjective evaluation criteria (see, for example, Patent Document 6: Japanese Patent Application Laid-Open No. H09-006802). An evaluation score input is received from an evaluator, a set of data of an evaluator identifier and an evaluation score inputted by the evaluator, and between-evaluator difference data showing different assignment methods of evaluation scores among the evaluators are corrected, a sensitivity database is searched based on a search condition generated according to the corrected result, and the search result is displayed.

However, no method has been established to help learn about the relationship between a plurality of entities and sensitivity information associated with a text group searched from a database constructed based on texts issued in relation to the plurality of entities.

SUMMARY

An information management system according to an embodiment of the disclosure includes a first input processing element, a second input processing element, a first output processing element, and a second output processing element. The first input processing element performs a designated filter process on public information related to each of a plurality of entities to acquire a primary text group composed of a plurality of primary texts respectively described in a plurality of different languages, and translates at least a part of the primary texts constituting the primary text group into a designated language to convert the primary text group into a secondary text group composed of a plurality of secondary texts described in the designated language. The second input processing element extracts sensitivity information respectively from each of the plurality of secondary texts constituting the secondary text group and classifies the sensitivity information into each of a plurality of sensitivity categories, and then constructs a database in which the sensitivity information respectively classified into each of the plurality of sensitivity categories and each of the plurality of secondary texts are associated with each other. Based on a designated keyword inputted through an input interface, the first output processing element searches for a designated text group that is a part of the secondary text group from the database constructed by the second input processing element. The second output processing element simultaneously outputs, on an output interface, each of a plurality of reference images showing an occurrence frequency of the sensitivity information in each of the plurality of sensitivity categories associated with each of designated texts in an identifiable form according to a difference in the sensitivity categories, and the designated texts constitute the designated text group searched by the first output processing element.

According to the information management system having the above configuration, among public information related to a plurality of entities, at least a part of primary texts among a plurality of primary texts constituting a primary text group described respectively in a plurality of different languages is translated into a designated language. "Entity" is a concept including a juridical person, or an organization that does not have juridical personality, and/or an individual. "Text group" may be composed of a plurality of texts or may be composed of one text.

Herein, the primary texts originally described in the designated language do not need to be translated into the designated language. As a result, the primary text group composed of the plurality of primary texts is converted into a secondary text group composed of a plurality of secondary texts described in the designated language. Then, each of the plurality of secondary texts is associated with sensitivity information extracted from each of the plurality of secondary texts and a sensitivity category of the sensitivity information to construct a database. Since the database is constructed based on a plurality of different languages, the amount of information in the database is increased, and thus the usefulness and convenience are improved.

Based on a designated text group searched from the database according to a designated keyword, each of a plurality of reference images respectively corresponding to the plurality of entities is simultaneously outputted on the output interface. The reference image is an image showing an occurrence frequency of the sensitivity information of each sensitivity category associated with each of the designated texts constituting the designated text group in an identifiable form according to the difference in the sensitivity categories. Accordingly, for each of the plurality of entities, it is possible to enable a user in contact with the output interface to compare the occurrence frequency of the sensitivity information (sensitivity information derived from the primary text related to each of the plurality of entities) in each sensitivity category shown by the reference image.

In the information management system having the above configuration according to an embodiment, in response to one reference image being selected through the input interface among the plurality of reference images about each of the plurality of entities outputted on the output interface, the second output processing element may output, on the output interface, a primary image showing an occurrence frequency of the designated texts in each of a plurality of designated unit periods for one entity corresponding to the one reference image.

According to the information management system having the above configuration, by selecting one reference image among the plurality of reference images about each of the plurality of entities outputted on the output interface through the input interface, deep mining of information (or provision of additional information to the user) becomes possible. Specifically, for the one entity corresponding to the one reference image, it is possible to enable the user in contact with the output interface to learn about the occurrence frequency of the plurality of designated texts constituting the designated text group in each of a plurality of designated unit periods shown by the primary image.

In the information management system having the above configuration according to an embodiment, in response to one designated unit period being selected through the input interface among the plurality of designated unit periods, the second output processing element may output, on the output interface, a part of the designated texts among the designated texts occurring in the one designated unit period.

According to the information management system having the above configuration, by selecting, through the input interface, one designated unit period among a plurality of designated unit periods related to the primary image outputted on the output interface, deep mining of information becomes possible. Specifically, it is possible to enable the user in contact with the output interface to learn about the contents of at least a part of the designated texts among the designated texts occurring in the selected one designated unit period.

In the information management system having the above configuration according to an embodiment, in response to one reference image being selected through the input interface among the plurality of reference images about each of the plurality of entities outputted on the output interface, the second output processing element may output, on the output interface, a primary image showing a plurality of words constituting a word group, whose occurrence frequency in the designated text group occurring in a designated period satisfies a designated condition, for one entity corresponding to the one reference image.

According to the information management system having the above configuration, by selecting one reference image among the plurality of reference images about each of the plurality of entities outputted on the output interface through the input interface, deep mining of information becomes possible. Specifically, for the one entity corresponding to the one reference image, it is possible to enable the user in contact with the output interface to learn about the contents of a plurality of words constituting a word group, whose occurrence frequency in the designated text group occurring in the designated period satisfies a designated condition, shown by the primary image.

In the information management system having the above configuration according to an embodiment, in response to one word being selected among the plurality of words through the input interface, the second output processing element may output, on the output interface, at least a part of the designated texts among the designated texts containing the one word.

According to the information management system having the above configuration, by selecting one word among the plurality of words outputted on the output interface through the input interface, deep mining of information becomes possible. Specifically, for the one entity corresponding to the one reference image, it is possible to enable the user in contact with the output interface to learn about the contents of a part of the designated texts containing the one word.

In the information management system having the above configuration according to an embodiment, in response to one reference image being selected through the input interface among the plurality of reference images about each of the plurality of entities outputted on the output interface, and one sensitivity category being selected among the plurality of sensitivity categories, the second output processing element may output, on the output interface, a primary image showing an occurrence frequency of the sensitivity information classified into the one sensitivity category in each of a plurality of designated unit periods for one entity corresponding to the one reference image.

According to the information management system having the above configuration, by selecting one reference image among a plurality of reference images about each of the plurality of entities outputted on the output interface through the input interface and selecting one sensitivity category among a plurality of sensitivity categories of the sensitivity information through the input interface, deep mining of information becomes possible. Specifically, for the one entity corresponding to the one reference image, it is possible to enable the user in contact with the output interface to learn about the occurrence frequency of the sensitivity information classified into the one sensitivity category shown by the primary image in each of a plurality of designated unit periods.

In the information management system having the above configuration according to an embodiment, in response to one designated unit period being selected among the plurality of designated unit periods through the input interface, the second output processing element may output, on the output interface, a secondary image showing an occurrence frequency of the sensitivity information classified into the one sensitivity category occurring in the one designated unit period in each of a plurality of sub-sensitivity categories.

According to the information management system having the above configuration, by selecting, through the input interface, one designated unit period among a plurality of designated unit periods related to the primary image about each entity outputted on the output interface, deep mining of information becomes possible. Specifically, it is possible to enable the user in contact with the output interface to learn about the occurrence frequency of the sensitivity information in each of a plurality of sub-sensitivity categories (lower sensitivity categories of the one corresponding sensitivity category) shown by the secondary image.

In the information management system having the above configuration according to an embodiment, in response to one sub-sensitivity category being selected among the plurality of sub-sensitivity categories through the input interface, the second output processing element may output, on the output interface, the designated texts associated with the sensitivity information classified into the one sub-sensitivity category.

According to the information management system having the above configuration, by selecting, through the input interface, one sub-sensitivity category among a plurality of sub-sensitivity categories about each entity outputted on the output interface, deep mining of information becomes possible. Specifically, it is possible to enable the user in contact with the output interface to learn about the contents of the designated texts associated with the sensitivity information classified into the selected one sub-sensitivity category.

In the information management system having the above configuration according to an embodiment, the second output processing element may extract a topics group composed of topics described in the designated language from each of the plurality of secondary texts, and for each of the plurality of entities, output the topics group respectively in association with each of the plurality of reference images on the output interface.

According to the information management system having the above configuration, in addition to the classification result of the sensitivity information with respect to each sensitivity category shown by each of the plurality of reference images, it is possible to enable the user in contact with the output interface to learn about the contents of the topics group extracted from the secondary text group related to each entity which is the extraction source of the sensitivity information.

In the information management system having the above configuration according to an embodiment, the second output processing element may extract a part of the designated texts among the plurality of designated texts, and for each of the plurality of entities, output the part of the designated texts respectively in association with each of the plurality of reference images on the output interface.

According to the information management system having the above configuration, in addition to the classification result of the sensitivity information with respect to each sensitivity category shown by each of the plurality of reference images, it is possible to enable the user in contact with the output interface to learn about the contents of the secondary texts constituting a part of the secondary text group related to each entity which is the extraction source of the sensitivity information.

In the information management system having the above configuration according to an embodiment, after removing noise from each of the plurality of secondary texts, the second input processing element may construct a database by associating the sensitivity information with each of the plurality of secondary texts from which the noise has been removed.

According to the information management system having the above configuration, it is possible to improve the usefulness of a database composed of the secondary text group from which noise is removed, and thus improve the usefulness of the information derived from the designated text group searched from the database.

DESCRIPTION OF THE EMBODIMENTS

Embodiments of the disclosure provide an information management system capable of improving the usefulness of information extracted from a text group related to each of a plurality of entities. Hereinafter, the embodiments of the disclosure will be described with reference to the drawings.

(Configuration)

Figure 1:
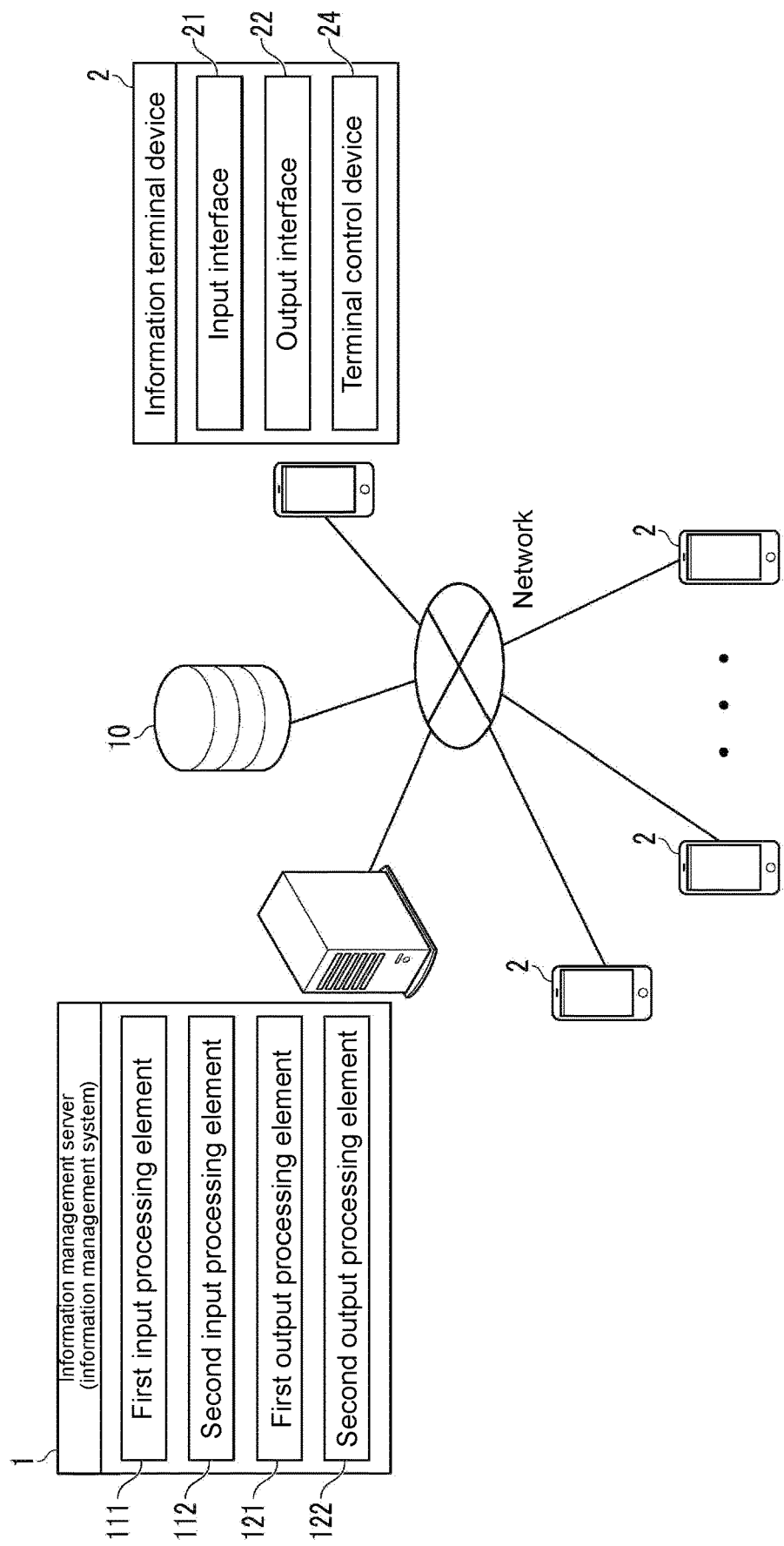
FIG. 1 is a view showing a configuration of an information management system as an embodiment of the disclosure.

An information management system as an embodiment of the disclosure as shown in FIG. 1 is configured by an information management server 1 capable of communicating with an information terminal device 2 and a database server 10 via a network. The database server 10 may also be a component of the information management server 1.

The information management server 1 includes a first input processing element 111, a second input processing element 112, a first output processing element 121, and a second output processing element 122. Each of the elements 111, 112, 121, and 122 is configured by an arithmetic processing device (configured by hardware such as a CPU, a single-core processor, and/or a multi-core processor) which reads necessary data and program (software) from a storage device (configured by a memory such as a ROM, a RAM, and an EEPROM, or hardware such as an SSD and an HDD), and then executes arithmetic processing on the data according to the program.

The information terminal device 2 is configured by a portable terminal device such as a smartphone, a tablet terminal device, and/or a notebook computer, and may also be configured by a stationary terminal device such as a desktop computer. The information terminal device 2 includes an input interface 21, an output interface 22, and a terminal control device 24. The input interface 21 may be configured by, for example, a touch panel-type button and a voice recognition device having a microphone. The output interface 22 may be configured by, for example, a display device constituting a touch panel and an audio output device. The terminal control device 24 is configured by an arithmetic processing device (configured by hardware such as a CPU, a single-core processor, and/or a multi-core processor) which reads necessary data and program (software) from a storage device (configured by a memory such as a ROM, a RAM, and an EEPROM, or hardware such as an SSD and an HDD), and then executes arithmetic processing on the data according to the program.

(First Function)

As a first function of the information management system having the above configuration, a database construction function will be described with reference to the flowchart of FIG. 2. A series of processes related to the first function may be repeatedly executed periodically (e.g., every 60 minutes).

Figure 2:
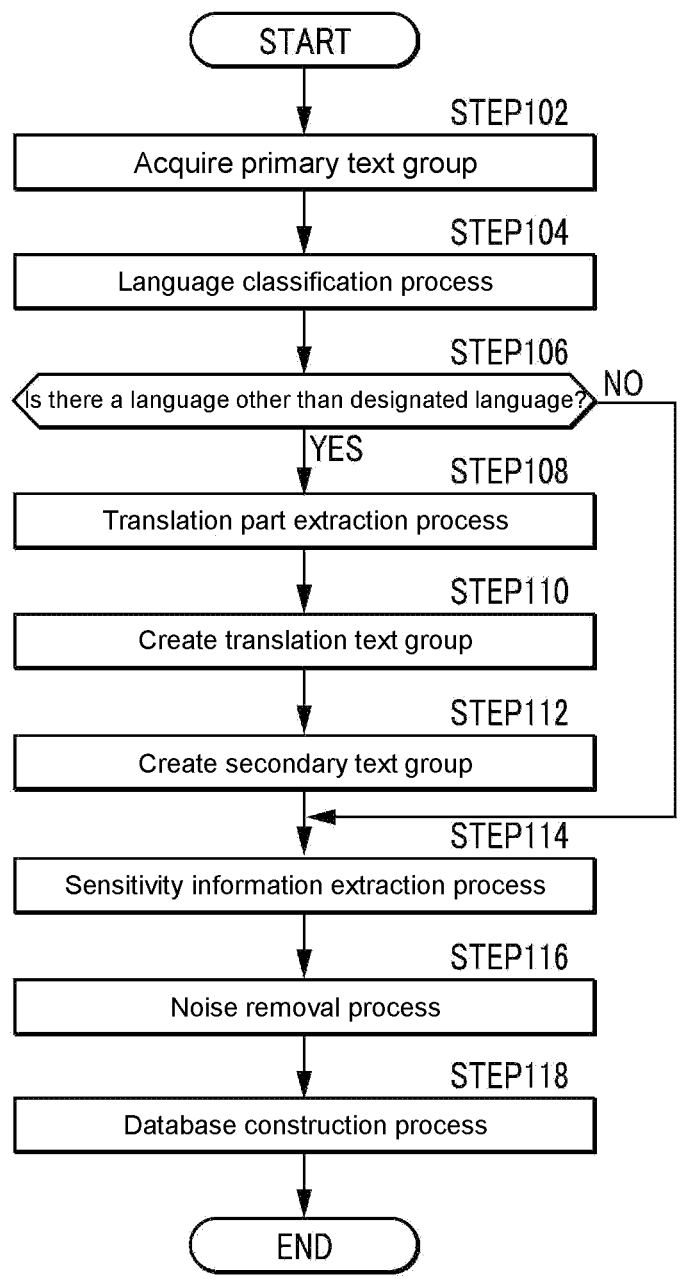
FIG. 2 is a flowchart showing a database construction method.

The first input processing element 111 performs a designated filter process on public information related to each of a plurality of entities to acquire a primary text group composed of a plurality of primary texts described respectively in a plurality of different languages (FIG. 2/STEP102).

"Public information" is acquired via the network from designated media such as mass media (e.g., TV, radio, and newspapers), network media (e.g., electronic bulletin boards, blogs, and social networking services (SNS)), and multimedia. The primary text is attached with a time stamp indicating a characteristic time point, such as a time point when the primary text is posted, a time point when the primary text is published, and/or a time point when the primary text is edited.

Figure 3:
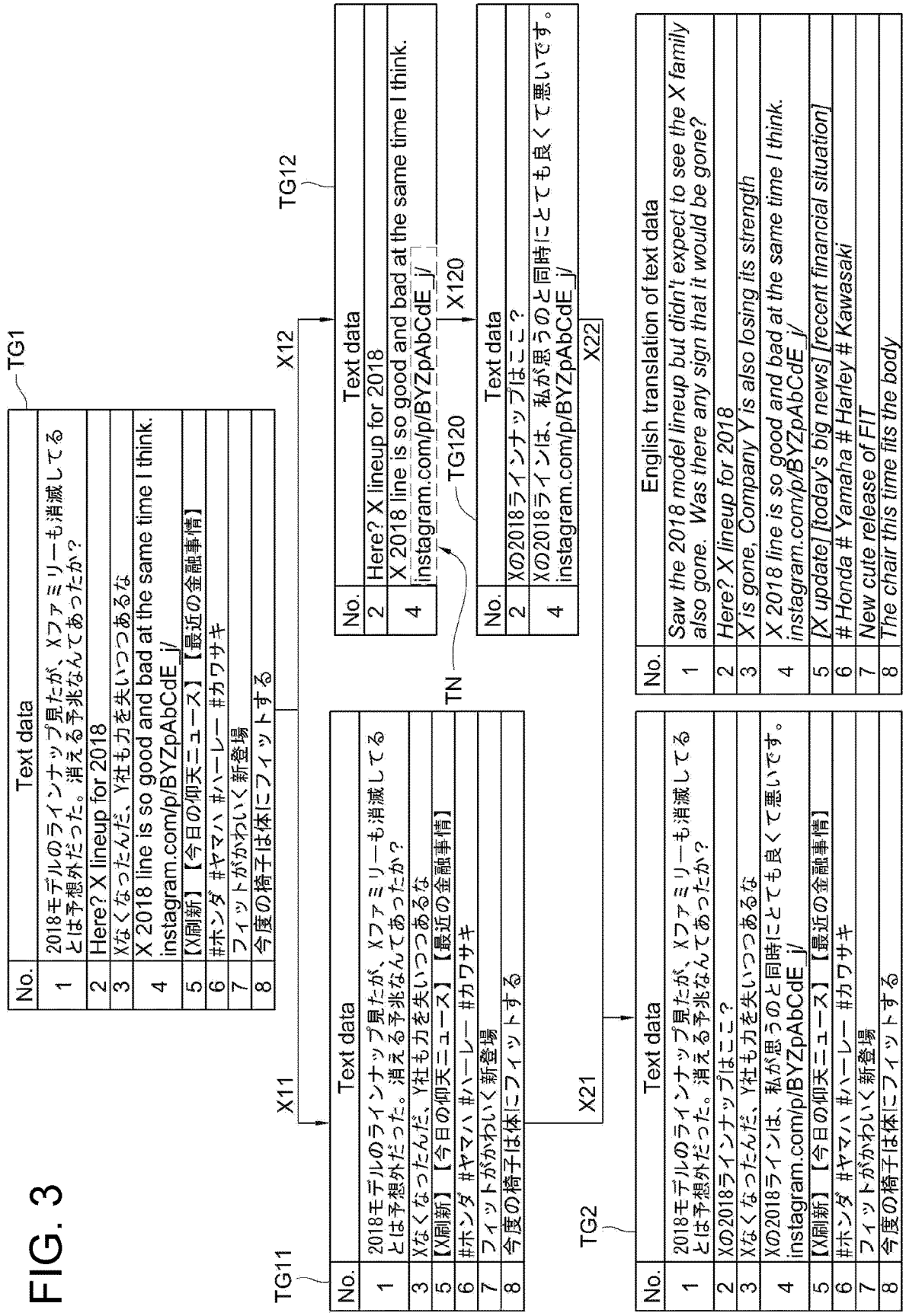
FIG. 3 is a view illustrating a database construction method. English translations respectively corresponding to Japanese texts No. 1 to No. 8 are provided at the lower right corner of FIG. 3 as reference.

Accordingly, for example, as shown in FIG. 3, text data in which a primary text group TG1 composed of eight primary texts contains vehicle-related terms is acquired. The primary text data is, for example, a text associated with a vehicle, in which "X" represents the name/abbreviation of the vehicle and "Y" represents the name/abbreviation of the vehicle manufacturing company. English translations respectively corresponding to Japanese texts No. 1 to No. 8 in text groups TG1, TG11, TG120, and TG2 are provided at the lower right corner of FIG. 3 as reference for understanding the embodiment of the disclosure. In addition, the vehicle-related terms are terms in vehicle-related fields such as motorcycles and four-wheeled vehicles, and specifically, vehicle names, vehicle manufacturing company names, president names of vehicle manufacturing companies, vehicle parts terms, vehicle competition terms, racer names, and the like correspond to the vehicle-related terms. In addition to selectively acquiring a primary text group associated with one designated field such as a vehicle-related field, a clothing-related field, a grocery-related field, and a toy-related field, a primary text group associated with a plurality of designated fields may also be acquired.

Next, the first input processing element 111 executes a language classification process on the primary text group (FIG. 2/STEP104). Specifically, the primary texts constituting the primary text group are classified into texts in a designated language (e.g., Japanese, English, Chinese, etc.) and texts in a language other than the designated language. Accordingly, for example, the primary text group TG1 shown in FIG. 3 is classified into a primary text group TG11 in Japanese, which is the designated language, and a primary text group TG12 in a language such as English other than the designated language (see FIG. 3/arrow X11 and arrow X12). The language other than the designated language may include not only one language but also a plurality of languages.

When the primary text group data is classified as described above, the first input processing element 111 determines whether there is a primary text in a language other than the designated language (FIG. 2/STEP106). When the determination result is negative (FIG. 2/STEP106 . . . NO), i.e., when the primary text group is composed only of primary texts described in the designated language, a sensitivity information extraction process is executed on the primary text group (FIG. 2/STEP114).

On the other hand, when the determination result is positive (FIG. 2/STEP106 . . . YES), the first input processing element 111 executes a translation part extraction process which extracts, as a translation part, a part requiring translation from the primary text in a language other than the designated language (FIG. 2/STEP108). Accordingly, for example, among the primary texts constituting the primary text group TG12 in a language other than the designated language as shown in FIG. 3, the part excluding URL data (see the part surrounded by a broken line TN) is extracted as the translation part.

Subsequently, the first input processing element 111 executes a machine translation process on the translation part to generate a translation text group (FIG. 2/STEP110). Accordingly, for example, by machine-translating the translation part (the part excluding the URL data) among the primary texts constituting the primary text group TG12 in a language other than the designated language as shown in FIG. 3, a translation text group TG120 is obtained (see FIG. 3/arrow X120).

Then, the first input processing element 111 integrates the primary text group and the translation text group in the designated language to generate a secondary text group composed of secondary texts (FIG. 2/STEP112). Accordingly, for example, by integrating the primary text group TG11 and the translation text group TG120 in the designated language as shown in FIG. 3, a secondary text group TG2 composed of 8 texts, i.e., the same number as the texts of the primary text group TG1, is created (see FIG. 3/arrow X21 and arrow X22). When the primary text group does not include a primary text described in a language other than the designated language, the primary text group is directly defined as the secondary text group.

Subsequently, the second input processing element 112 executes a sensitivity information extraction process from each of the secondary texts constituting the secondary text group (FIG. 2/STEP114). At this time, an analysis part requiring analysis is extracted from the secondary text group or each of the secondary texts constituting the secondary text group. For example, a secondary text that is merely a list of titles and nouns is excluded from the analysis part. According to a language comprehension algorithm for understanding/determining a construction of the secondary text and/or a connection relationship of words included in the secondary text, sensitivity information is extracted from the analysis part, and the sensitivity information is classified into each of a plurality of sensitivity categories.

For example, the sensitivity information is classified in two stages into three upper sensitivity categories "Positive", "Neutral", and "Negative" and into lower sensitivity categories of the upper sensitivity category. For example, "happy" and "want to buy" correspond to lower sensitivity categories of the upper sensitivity category "Positive". "Surprise" and "solicitation" correspond to lower sensitivity categories of the upper sensitivity category "Neutral". "Angry" and "don't want to buy" correspond to lower sensitivity categories of the upper sensitivity category "Negative".

The second input processing element 112 executes a noise removal process on the secondary text group (FIG. 2/STEP116). Specifically, a morphological analysis is performed on the secondary text. Further, when a designated noun of a vehicle-related term is contained in the secondary text, it may be determined whether the data is noise data based on a part of speech of the word following the designated noun. For example, in Japanese, when the part of speech of the word following the designated noun contained in the secondary text is a case particle, and the case particle indicates any of the subjective case, the objective case, and the possessive case, it is determined that the secondary text is not noise. On the other hand, in other cases, it is determined that the secondary text is noise. Then, the secondary text determined to be noise is removed from the secondary text group. The noise removal process may also be omitted.

For example, although the secondary text "No. 8" constituting the secondary text group TG2 shown in FIG. 3 contains the product name "フィット" (English translation: fit) as a noun, since the word following the noun is not a case particle but a verb "する" (English translation: do), this secondary text is determined to be noise and is removed from the secondary text group TG2.

Then, the second input processing element 112 associates each of the secondary texts constituting the secondary text group with the sensitivity information classified into the sensitivity category extracted from the secondary text to construct a database (FIG. 2/STEP118). The constructed database is defined as a database configured by the database server 10 shown in FIG. 1. At this time, data may be exchanged between the information management server 1 and the database server 10 via the network.

(Second Function)

As a second function of the information management system having the above configuration, an information management function will be described with reference to the flowchart of FIG. 4.

Figure 4:
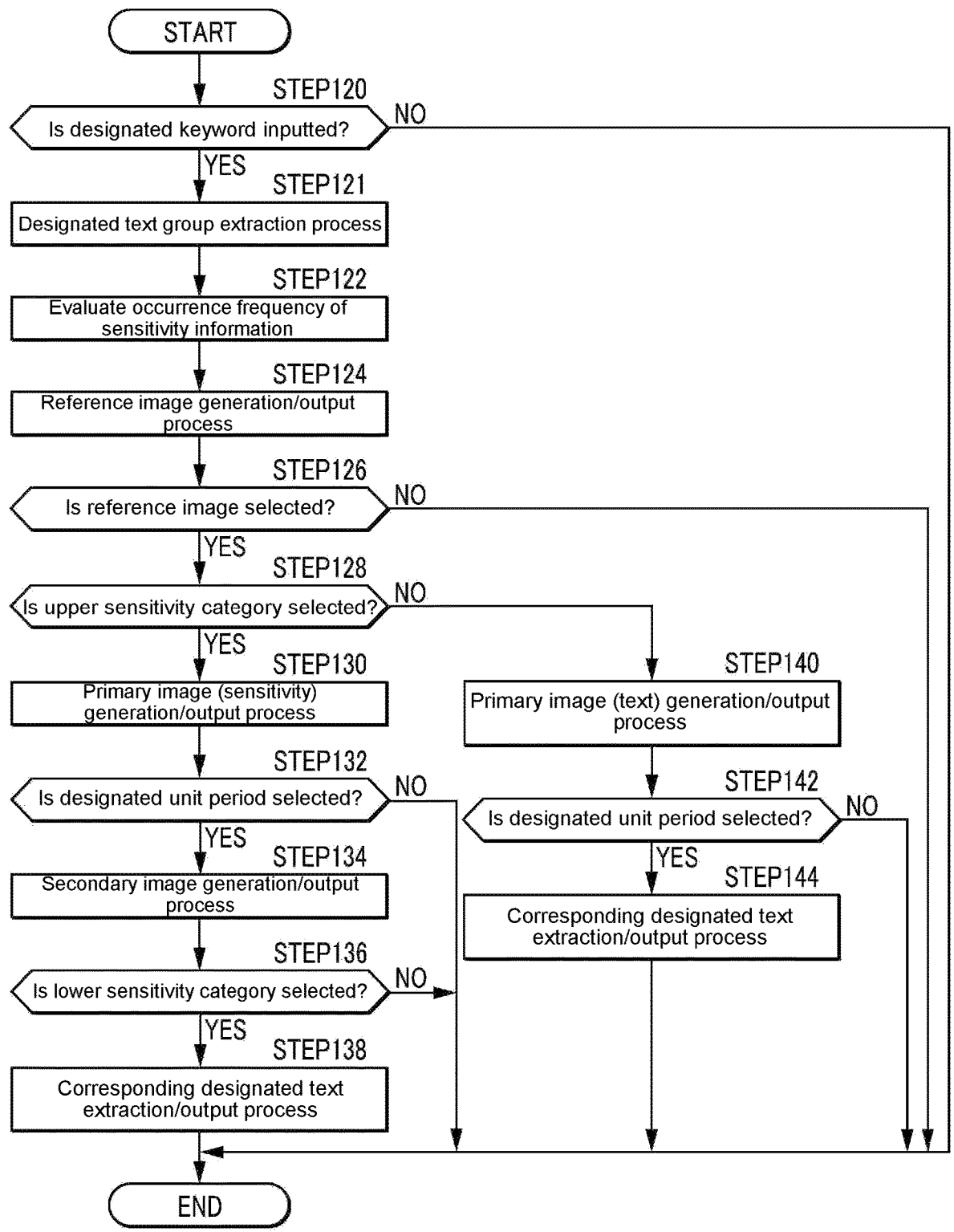
FIG. 4 is a flowchart of an information management method.

Based on communication with the information terminal device 2, the first output processing element 121 determines whether a designated keyword is inputted through the input interface 21 constituting the information terminal device 2 (FIG. 4/STEP120). When the determination result is negative (FIG. 4/STEP120 . . . NO), the series of processes is ended.

On the other hand, when the determination result is positive (FIG. 4/STEP120 . . . YES), based on the designated keyword, the first output processing element 121 searches for a designated text group, which is a part of the secondary text groups, from the database (database server 10) constructed by the second input processing element 112 (FIG. 4/STEP121). Each of designated texts constituting the designated text group contains the designated keyword and/or a synonym thereof.

Further, for each sensitivity category, the second output processing element 122 evaluates an occurrence frequency, over a designated period and a plurality of designated unit periods constituting the designated period, of the sensitivity information over the designated period that is associated with each of the designated texts and stored in the database (FIG. 4/STEP122). The occurrence time point of the sensitivity information is specified by the time stamp attached to the primary text, i.e., the origin of the designated text, from which the sensitivity information is extracted. It is evaluated that the occurrence frequency of the sensitivity information classified into each of the upper sensitivity categories $C_j$ (j=1, 2, . . . ) is N ($C_j$), and it is evaluated that the occurrence frequency of the sensitivity information classified into each of the lower sensitivity categories $C_{jq}$ (q=1, 2, . . . ) is N ($C_{jq}$).

Then, the second output processing element 122 generates a reference image showing the evaluation result and transmits the reference image to the information terminal device 2, and the reference image about each of a plurality of entities is simultaneously outputted on the output interface 22 of the information terminal device 2 (FIG. 4/STEP124).

Figure 5:
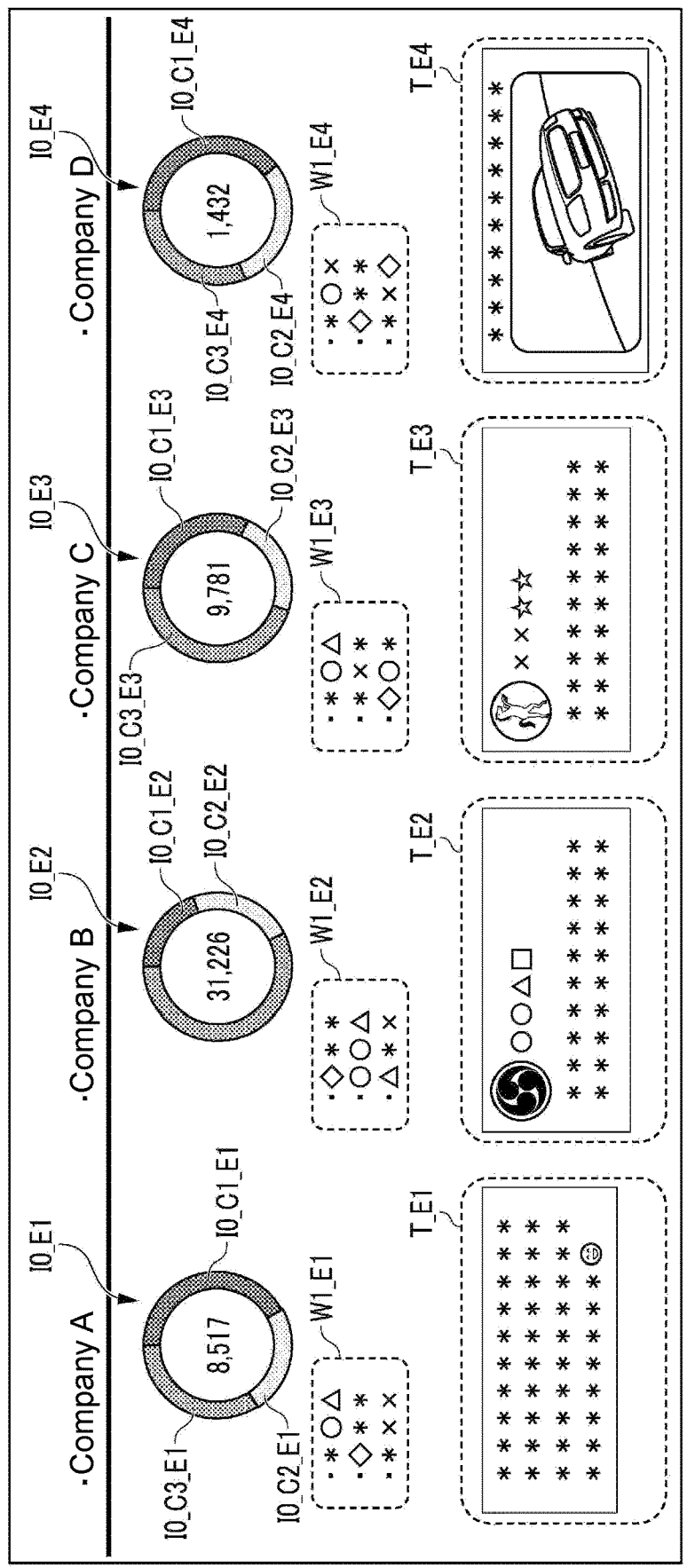
FIG. 5 is a view showing a screen output mode according to an information management result.

Accordingly, as shown in FIG. 5, a circular graph is outputted as a reference image $I_0\_E_i$ about each of a plurality of entities $E_i$ (i=1, 2, . . . ), and the reference images $I_0\_E_i$ are simultaneously outputted on the output interface 22 of the information terminal device 2. As shown in FIG. 5, the circular graph is composed of arcuate diagrams $I_0\_C_1\_E_i$, $I_0\_C_2\_E_i$, and $I_0\_C_3\_E_i$ which show, by their lengths, the occurrence frequencies of the sensitivity information in the designated period classified into each of a first upper sensitivity category $C_1$ (=positive (having a positive nuance)), a second upper sensitivity category $C_2$ (=neutral (having a neutral nuance)), and a third upper sensitivity category $C_3$ (=negative (having a negative nuance)). The arcuate diagrams $I_0\_C_1\_E_i$, $I_0\_C_2\_E_i$, and $I_0\_C_3\_E_i$ may be identifiable by, for example, being shown in colors different from each other.

Further, as shown in FIG. 5, a topics group $W_1\_E_i$ composed of topics of an upper designated number having high occurrence frequencies in the designated text group about each entity $E_i$ may be associated in a form arranged near or below each reference image $I_0\_E_i$, for example, and outputted on the output interface 22 of the information terminal device 2. Further, as shown in FIG. 5, a part of the designated texts $T\_E_i$ constituting the designated text group about each entity $E_i$ may be associated in a form arranged near or below each reference image $I_0\_E_i$, for example, and outputted on the output interface 22 of the information terminal device 2.

Next, based on communication with the information terminal device 2, the second output processing element 122 determines whether one reference image is selected or designated among the plurality of reference images through the input interface 21 constituting the information terminal device 2 (FIG. 4/STEP126). When the determination result is negative (FIG. 4/STEP126 . . . NO), the series of processes is ended.

On the other hand, when the determination result is positive (FIG. 4/STEP126 . . . YES), based on communication with the information terminal device 2, the second output processing element 122 determines whether any one upper sensitivity category is selected or designated among the plurality of upper sensitivity categories through the input interface 21 constituting the information terminal device 2 (FIG. 4/STEP128).

When it is determined that one upper sensitivity category is selected (FIG. 4/STEP128 YES), for the one entity $E_i$ corresponding to the one reference image $I_0\_E_i$, the second output processing element 122 generates a primary image showing the occurrence frequency of the sensitivity information classified into the one sensitivity category $C_j$ in each of the plurality of designated unit periods, transmits the primary image to the information terminal device 2, and outputs the primary image on the output interface 22 of the information terminal device 2 (FIG. 4/STEP130).

Figure 6:
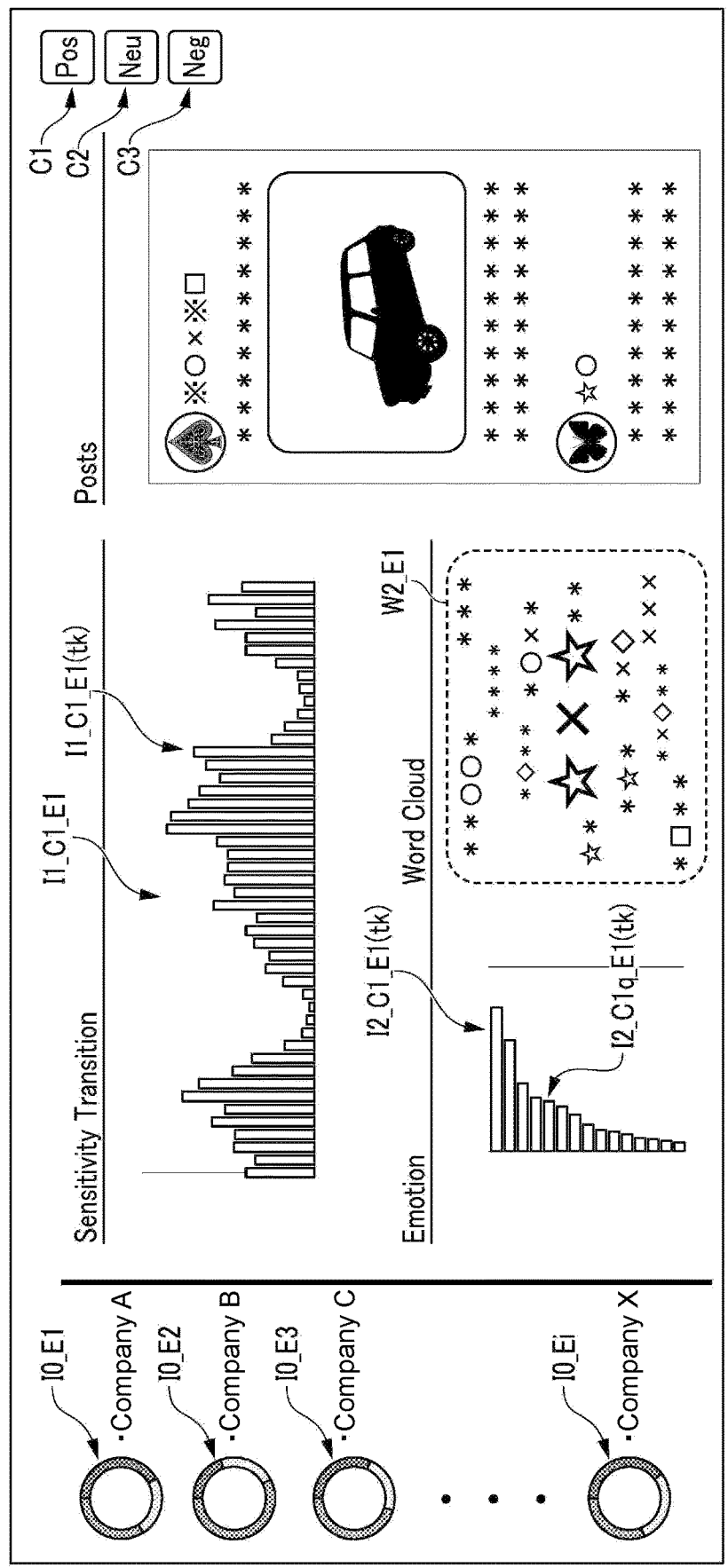
FIG. 6 is a view illustrating a first deep mining mode of information.

For example, in the output screen of the output interface 22 shown in FIG. 6, when one reference image $I_0\_E_1$ on the left side is selected and one upper sensitivity category $C_1$ (=positive) on the right side is selected, a primary image $I_1\_C_1\_E_1$ is outputted on the output interface 22 of the information terminal device 2. For example, as shown in FIG. 6, the primary image $I_1\_C_1\_E_1$ is composed of bar-shaped icons $I_1\_C_1\_E_1(t_k)$ arranged in time series indicating the occurrence frequency of the sensitivity information classified into the upper sensitivity category $C_1$ in each of a plurality of designated unit periods $t_k$.

Further, based on communication with the information terminal device 2, the second output processing element 122 determines whether any one designated unit period $t_k$ is selected or designated among the plurality of designated unit periods through the input interface 21 constituting the information terminal device 2 (FIG. 4/STEP132). When the determination result is negative (FIG. 4/STEP132 . . . NO), the series of processes is ended.

On the other hand, when it is determined that one designated unit period $t_k$ is selected (FIG. 4/STEP132 . . . YES), the second output processing element 122 generates a secondary image showing the occurrence frequency, in each of a plurality of sub-sensitivity categories $C_{jq}$, of the sensitivity information classified into the one sensitivity category $C_j$ occurring in the one designated unit period $t_k$, transmits the secondary image to the information terminal device 2, and outputs the secondary image on the output interface 22 of the information terminal device 2 (FIG. 4/STEP134).

For example, when one icon $I_1\_C_1\_E_1(t_k)$ among the plurality of bar-shaped icons constituting the primary image $I_1\_C_1\_E_1$ shown in FIG. 6 (and thus one corresponding designated unit period $t_k$) is selected, a secondary image $I_2\_C_1\_E_1(t_k)$ is outputted on the output interface 22 of the information terminal device 2. For example, as shown in FIG. 6, the secondary image $I_2\_C_1\_E_1(t_k)$ is composed of bar-shaped icons $I_2\_C_{1q}\_E_1(t_k)$ indicating the occurrence frequency of the sensitivity information classified into the lower sensitivity category $C_{1q}$ in the one designated unit period $t_k$.

Further, based on communication with the information terminal device 2, the second output processing element 122 determines whether one lower sensitivity category $C_{jq}$ is selected or designated among the plurality of lower sensitivity categories through the input interface 21 constituting the information terminal device 2 (FIG. 4/STEP136). When the determination result is negative (FIG. 4/STEP136 . . . NO), the series of processes is ended.

On the other hand, when it is determined that the lower sensitivity category $C_{jq}$ is selected (FIG. 4/STEP136 . . . YES), the second output processing element 122 extracts, from the database, a designated text associated with the sensitivity information classified into the one lower sensitivity category $C_{jq}$ occurring in the corresponding one designated unit period $t_k$, transmits the designated text to the information terminal device 2, and outputs the designated text on the output interface 22 of the information terminal device 2 (FIG. 4/STEP134).

Figure 7:
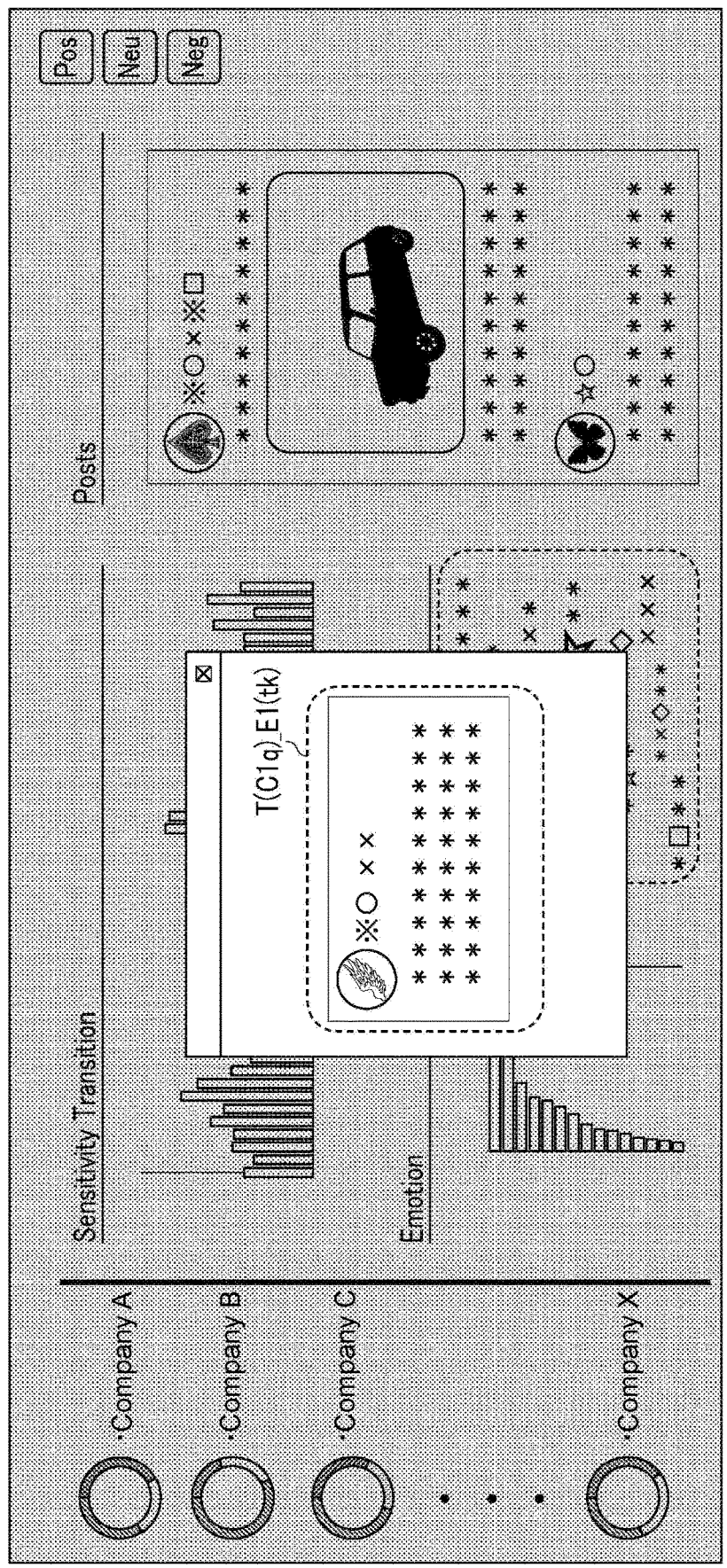
FIG. 7 is a view illustrating a second deep mining mode of information.

For example, when the bar-shaped icon $I_2\_C_{1q}\_E_1(t_k)$ constituting the secondary image $I_2\_C_1\_E_1(t_k)$ shown in FIG. 6 (and thus the corresponding lower sensitivity category $C_{1q}$) is selected, as shown in FIG. 7, among designated texts related to a first entity $E_1$, a designated text $T(C_{1q})\_E_1(t_k)$ corresponding to the sensitivity information classified into the lower sensitivity category $C_{1q}$ occurring in the designated unit period $t_k$ is outputted on the output interface 22 of the information terminal device 2.

Further, as shown in FIG. 6, a word group $W_2\_E_1$ composed of words of an upper designated number having high occurrence frequencies in the designated text group may be outputted on the output interface 22 of the information terminal device 2 in a word cloud format. When one word is selected from the word group $W_2\_E_1$, among the designated texts related to the first entity $E_1$, a designated text containing this word and/or a synonym thereof may be outputted on the output interface 22 of the information terminal device 2.

When it is determined that one upper sensitivity category is not selected (within a designated time) (FIG. 4/STEP128 . . . NO), for the one entity $E_i$ corresponding to the one reference image $I_0\_E_i$, the second output processing element 122 generates a primary image showing the occurrence frequency of the secondary texts in each of the plurality of designated unit periods, transmits the primary image to the information terminal device 2, and outputs the primary image on the output interface 22 of the information terminal device 2 (FIG. 4/STEP140).

Figure 8:
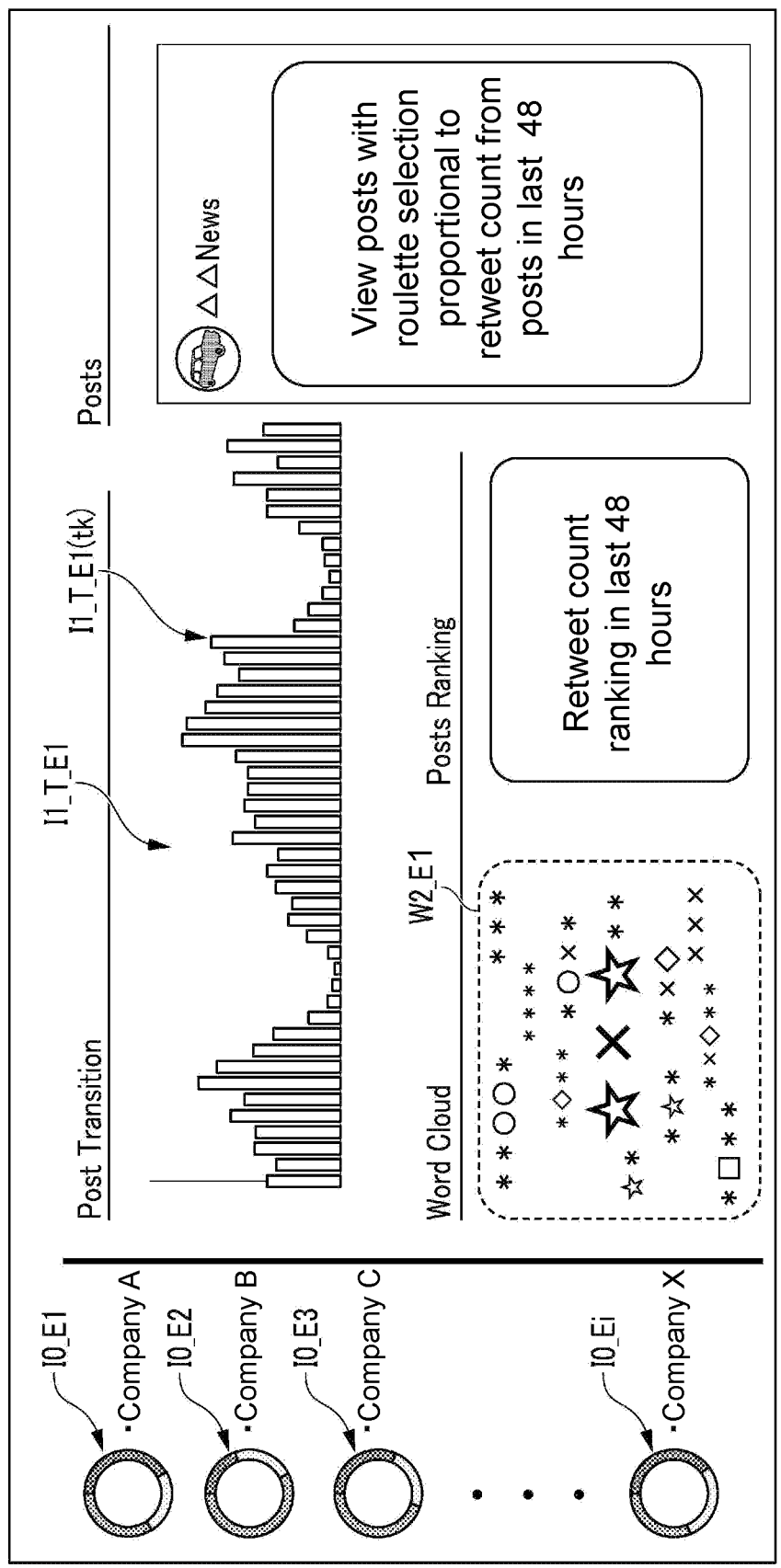
FIG. 8 is a view illustrating a third deep mining mode of information.

For example, in the output screen of the output interface 22 shown in FIG. 8, when one reference image $I_0\_E_1$ on the left side is selected, a primary image $I_1\_T\_E_1$ is outputted on the output interface 22 of the information terminal device 2. For example, as shown in FIG. 8, the primary image $I_1\_T\_E_1$ is composed of bar-shaped icons $I_1\_T\_E_1(t_k)$ arranged in time series indicating the occurrence frequency of the designated texts related to the first entity E1 in each of the plurality of designated unit periods $t_k$.

Further, based on communication with the information terminal device 2, the second output processing element 122 determines whether any one designated unit period $t_k$ is selected or designated among the plurality of designated unit periods through the input interface 21 constituting the information terminal device 2 (FIG. 4/STEP 142). When the determination result is negative (FIG. 4/STEP142 . . . NO), the series of processes is ended.

On the other hand, when it is determined that one designated unit period $t_k$ is selected (FIG. 4/STEP142 . . . YES), the second output processing element 122 extracts a part of the designated texts among the designated text group occurring in the one designated unit period $t_k$, transmits the designated texts to the information terminal device 2, and outputs the designated texts on the output interface 22 of the information terminal device 2 (FIG. 4/STEP 144).

Figure 9:
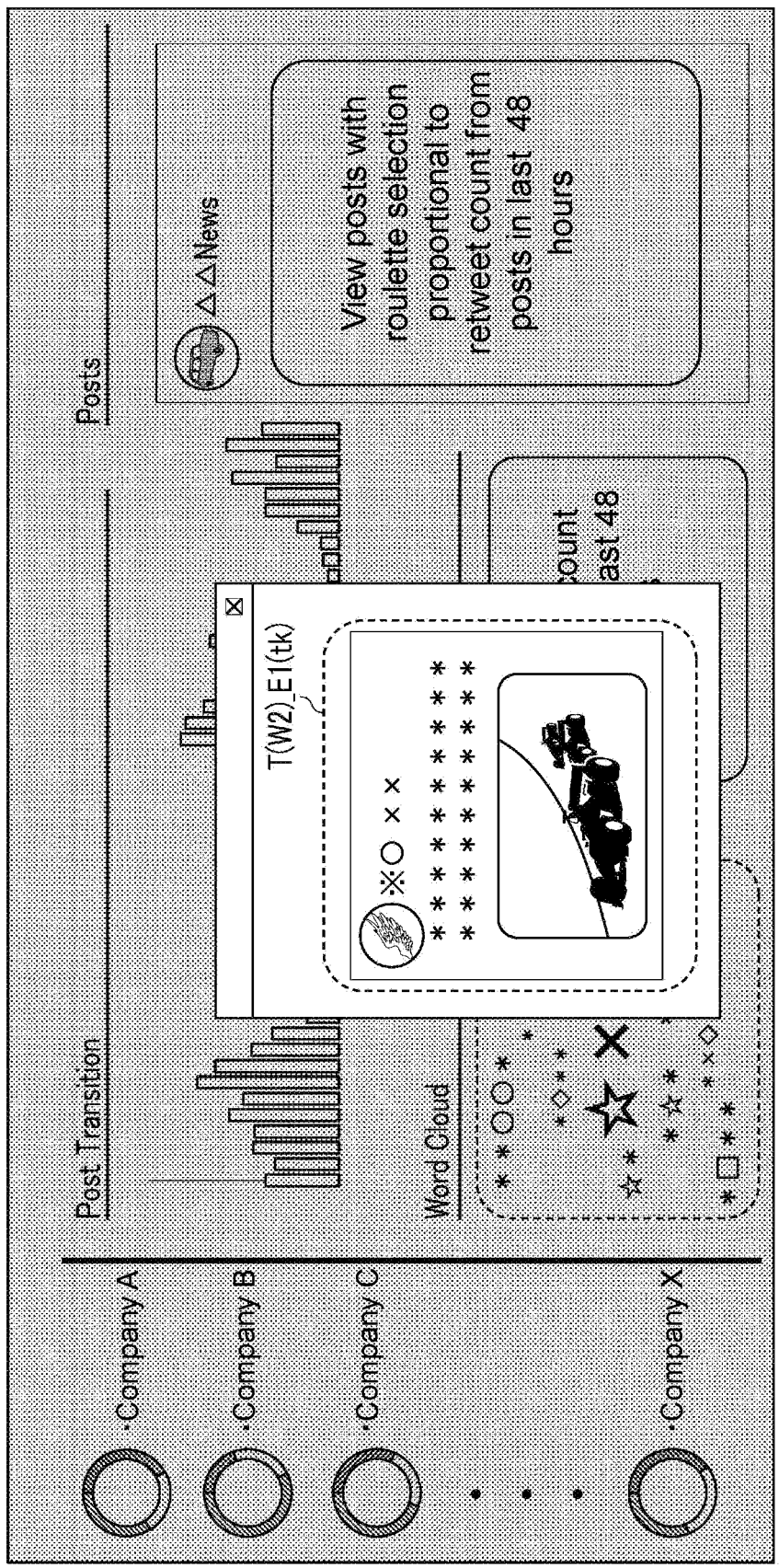
FIG. 9 is a view illustrating a fourth deep mining mode of information.

For example, when one icon $I_1\_T\_E_1(t_k)$ among the plurality of bar-shaped icons constituting the primary image $I_1\_T\_E_1$ shown in FIG. 8 (and thus one corresponding designated unit period $t_k$) is selected, as shown in FIG. 9, a corresponding designated text $T\_E_1$ is outputted on the output interface 22 of the information terminal device 2.

Further, as shown in FIG. 8, a word group $W_2\_E_1$ composed of words of an upper designated number having high occurrence frequencies in the designated text group may be outputted on the output interface 22 of the information terminal device 2 in a word cloud format. When one word is selected from the word group $W_2\_E_1$, among the designated texts related to the first entity $E_1$, a designated text containing this word and/or a synonym thereof may be outputted on the output interface 22 of the information terminal device 2.

(Operation Effect)

According to the information management system 1 having the above configuration, among public information related to a plurality of entities $E_i$, at least a part of primary texts among a plurality of primary texts constituting a primary text group described respectively in a plurality of different languages is translated into a designated language (see FIG. 2/STEP102→ . . . STEP110, FIG. 3/arrow X120). As a result, the primary text group composed of the plurality of primary texts is converted into a secondary text group composed of a plurality of secondary texts described in the designated language (see FIG. 2/STEP112, FIG. 3/arrow X21 and arrow X22). Then, each of the plurality of secondary texts is associated with sensitivity information extracted from each of the plurality of secondary texts and a sensitivity category of the sensitivity information to construct a database (database server 10) (see FIG. 2/STEP114→ . . . STEP118). Since the database is constructed based on a plurality of different languages, the amount of information in the database is increased, and thus the usefulness and convenience are improved.

Based on a designated text group searched from the database according to a designated keyword, each of a plurality of reference images $I_0\_E_i$ corresponding to each entity $E_i$ is simultaneously outputted on the output interface (see FIG. 4/STEP120 . . . YES→ . . . → STEP124, FIG. 5 and FIG. 6). The reference image $I_0\_E_i$ is an image showing an occurrence frequency of the sensitivity information of each upper sensitivity category $C_j$ associated with each of the designated texts constituting the designated text group in an identifiable form according to the difference in the upper sensitivity category $C_j$ (see FIG. 5 and FIG. 6). Accordingly, for each of a plurality of entities $E_i$, it is possible to enable a user in contact with the output interface 22 to compare the occurrence frequency of the sensitivity information (sensitivity information derived from the primary text related to each of the plurality of entities $E_i$) in each upper sensitivity category $C_j$ shown by the reference image $I_0\_E_i$.

By selecting one reference image $I_0\_E_i$ among the plurality of reference images outputted on the output interface 22 through the input interface 21, deep mining of information (or provision of additional information to the user) becomes possible (see FIG. 4/STEP126 . . . YES→ . . . → STEP140). Specifically, for the one entity $E_i$ corresponding to the one reference image $I_0\_E_i$, it is possible to enable the user in contact with the output interface 22 to learn about the occurrence frequency of the designated texts constituting the designated text group in each of a plurality of designated unit periods $t_k$ shown by the primary image $I_1\_T\_E_i$ (see FIG. 8).

Further, for the one entity $E_i$ corresponding to the one reference image $I_0\_E_i$, it is possible to enable the user in contact with the output interface 22 to learn about the contents of a plurality of words constituting a word group $W_2\_E_1$, whose occurrence frequency in the designated text group occurring in the designated period satisfies a designated condition, shown by the primary image (see FIG. 8). Further, by selecting one word among the plurality of words outputted on the output interface 22 through the input interface 21, deep mining of information becomes possible. Specifically, for the one entity $E_i$ corresponding to the one reference image $I_0\_E_i$, it is possible to enable the user in contact with the output interface 22 to learn about the contents of a part of the designated texts containing the one word (see FIG. 9).

By selecting, through the input interface 21, one designated unit period $t_k$ among a plurality of designated unit periods related to the primary image $I_1\_T\_E_i$ outputted on the output interface 22, deep mining of information becomes possible (see FIG. 4/STEP142 . . . YES→STEP144). Specifically, it is possible to enable the user in contact with the output interface 22 to learn about the contents of at least a part of the designated texts among the designated texts occurring in the selected one designated unit period $t_k$ (see FIG. 9).

By selecting one reference image $I_0\_E_i$ among a plurality of reference images outputted on the output interface 22 through the input interface 21 and selecting one sensitivity category $C_j$ among a plurality of upper sensitivity categories through the input interface, deep mining of information becomes possible (see FIG. 4/STEP126 . . . YES→ STEP128 . . . YES→STEP130). Specifically, for the one entity $E_i$ corresponding to the one reference image $I_0\_E_i$, it is possible to enable the user in contact with the output interface 22 to learn about the occurrence frequency of the sensitivity information classified into the one upper sensitivity category $C_j$ shown by the primary image $I_1\_C_j\_E_i$ in each designated unit period $t_k$ (see FIG. 6).

By selecting, through the input interface 21, one designated unit period $t_k$ among a plurality of designated unit periods related to the primary image $I_1\_C_j\_E_i$ about each entity $E_i$ outputted on the output interface 22, deep mining of information becomes possible (see FIG. 4/STEP132 . . . YES→STEP134). Specifically, it is possible to enable the user in contact with the output interface 22 to learn about the occurrence frequency of the sensitivity information in each of a plurality of sub-sensitivity categories $C_{jq}$ (lower sensitivity categories of the one corresponding sensitivity category) shown by the secondary image $I_2\_C_j\_E_i(t_k)$ (see FIG. 6).

By selecting, through the input interface 21, one sub-sensitivity category $C_{jq}$ among a plurality of sub-sensitivity categories about each entity $E_i$ outputted on the output interface, deep mining of information becomes possible (see FIG. 4/STEP136 . . . YES→STEP138). Specifically, it is possible to enable the user in contact with the output interface 22 to learn about the contents of the designated texts associated with the sensitivity information classified into the selected one sub-sensitivity category $C_{jq}$ (see FIG. 7).

Other Embodiments of the Disclosure

In the above embodiment, machine translation is adopted as the designated translation method. However, any method may be adopted as long as the second text group can be translated into the first language, e.g., the second text group being translated into the first language through a translation operation performed by a translator or a complementary operation of machine translation performed by a translator.

In the above embodiment, the sensitivity categories are classified in two classes (upper sensitivity category and lower sensitivity category). However, as another embodiment, the sensitivity categories may be classified in only one class, or may be classified in three or more classes.

Either of the processes of FIG. 4/STEP128 to STEP138 and the processes of STEP140 to STEP144 in the above embodiment may be omitted.

What is claimed is:

1. An information management system comprising:
an information management server comprising a processor configured to:
perform a designated filter process on public information related to each of a plurality of entities to acquire a primary text group composed of a plurality of primary texts respectively described in a plurality of different languages, and translate at least a part of the primary texts constituting the primary text group into a designated language to convert the primary text group into a secondary text group composed of a plurality of secondary texts described in the designated language;
extract sensitivity information respectively from each of the plurality of secondary texts constituting the secondary text group and classify the sensitivity information into each of a plurality of sensitivity categories, and then construct a database in which the sensitivity information respectively classified into each of the plurality of sensitivity categories and each of the plurality of secondary texts are associated with each other;
based on a designated keyword inputted through an input interface, search for a designated text group that is a part of the secondary text group from the database; and
simultaneously output, on an output interface, each of a plurality of reference images respectively about each of the entities and showing an occurrence frequency of the sensitivity information in each of the plurality of sensitivity categories associated with each of designated texts in an identifiable form according to a difference in the sensitivity categories, wherein the designated texts constitute the designated text group.

2. The information management system according to claim 1, wherein in response to one reference image being selected through the input interface among the plurality of reference images about each of the plurality of entities outputted on the output interface, the processor outputs, on the output interface, a primary image showing an occurrence frequency of the designated texts in each of a plurality of designated unit periods for one entity corresponding to the one reference image.

3. The information management system according to claim 2, wherein in response to one designated unit period being selected through the input interface among the plurality of designated unit periods, the processor outputs, on the output interface, a part of the designated texts among the designated texts occurring in the one designated unit period.

4. The information management system according to claim 1, wherein in response to one reference image being selected through the input interface among the plurality of reference images about each of the plurality of entities outputted on the output interface, the processor outputs, on the output interface, a primary image showing a plurality of words constituting a word group, whose occurrence frequency in the designated text group occurring in a designated period satisfies a designated condition, for one entity corresponding to the one reference image.

5. The information management system according to claim 4, wherein in response to one word being selected among the plurality of words through the input interface, the processor outputs, on the output interface, at least a part of the designated texts among the designated texts containing the one word.

6. The information management system according to claim 1, wherein in response to one reference image being selected through the input interface among the plurality of reference images about each of the plurality of entities outputted on the output interface, and one sensitivity category being selected among the plurality of sensitivity categories, the processor outputs, on the output interface, a primary image showing an occurrence frequency of the sensitivity information classified into the one sensitivity category in each of a plurality of designated unit periods for one entity corresponding to the one reference image.

7. The information management system according to claim 6, wherein in response to one designated unit period being selected among the plurality of designated unit periods through the input interface, the processor outputs, on the output interface, a secondary image showing an occurrence frequency of the sensitivity information classified into the one sensitivity category occurring in the one designated unit period in each of a plurality of sub-sensitivity categories.

8. The information management system according to claim 7, wherein in response to one sub-sensitivity category being selected among the plurality of sub-sensitivity categories through the input interface, the processor outputs, on the output interface, the designated texts associated with the sensitivity information classified into the one sub-sensitivity category.

9. The information management system according to claim 1, wherein the processor extracts a topics group composed of topics described in the designated language from the designated text group, and for each of the plurality of entities, outputs the topics group respectively in association with each of the plurality of reference images on the output interface.

10. The information management system according to claim 2, wherein the processor extracts a topics group composed of topics described in the designated language from the designated text group, and for each of the plurality of entities, outputs the topics group respectively in association with each of the plurality of reference images on the output interface.

11. The information management system according to claim 3, wherein the processor extracts a topics group composed of topics described in the designated language from the designated text group, and for each of the plurality of entities, outputs the topics group respectively in association with each of the plurality of reference images on the output interface.

12. The information management system according to claim 4, wherein the processor extracts a topics group composed of topics described in the designated language from the designated text group, and for each of the plurality of entities, outputs the topics group respectively in association with each of the plurality of reference images on the output interface.

13. The information management system according to claim 5, wherein the processor extracts a topics group composed of topics described in the designated language from the designated text group, and for each of the plurality of entities, outputs the topics group respectively in association with each of the plurality of reference images on the output interface.

14. The information management system according to claim 6, wherein the processor extracts a topics group composed of topics described in the designated language from the designated text group, and for each of the plurality of entities, outputs the topics group respectively in association with each of the plurality of reference images on the output interface.

15. The information management system according to claim 7, wherein the processor extracts a topics group composed of topics described in the designated language from the designated text group, and for each of the plurality of entities, outputs the topics group respectively in association with each of the plurality of reference images on the output interface.

16. The information management system according to claim 8, wherein the processor extracts a topics group composed of topics described in the designated language from the designated text group, and for each of the plurality of entities, outputs the topics group respectively in association with each of the plurality of reference images on the output interface.

17. The information management system according to claim 1, wherein the processor extracts a part of the designated texts among the plurality of designated texts constituting the designated text group, and for each of the plurality of entities, outputs the part of the designated texts respectively in association with each of the plurality of reference images on the output interface.

18. The information management system according to claim 2, wherein the processor extracts a part of the designated texts among the plurality of designated texts constituting the designated text group, and for each of the plurality of entities, outputs the part of the designated texts respectively in association with each of the plurality of reference images on the output interface.

19. The information management system according to claim 3, wherein the processor extracts a part of the designated texts among the plurality of designated texts constituting the designated text group, and for each of the plurality of entities, outputs the part of the designated texts respectively in association with each of the plurality of reference images on the output interface.

20. The information management system according to claim 1, wherein after removing noise from each of the plurality of secondary texts, the processor constructs a database by associating the sensitivity information with each of the plurality of secondary texts from which the noise has been removed.

* * * * *